Feb. 20, 1934. G. D. KINGSLAND Re. 19,091
HEAT REGULATING DEVICE
Original Filed March 23, 1931 2 Sheets-Sheet 1
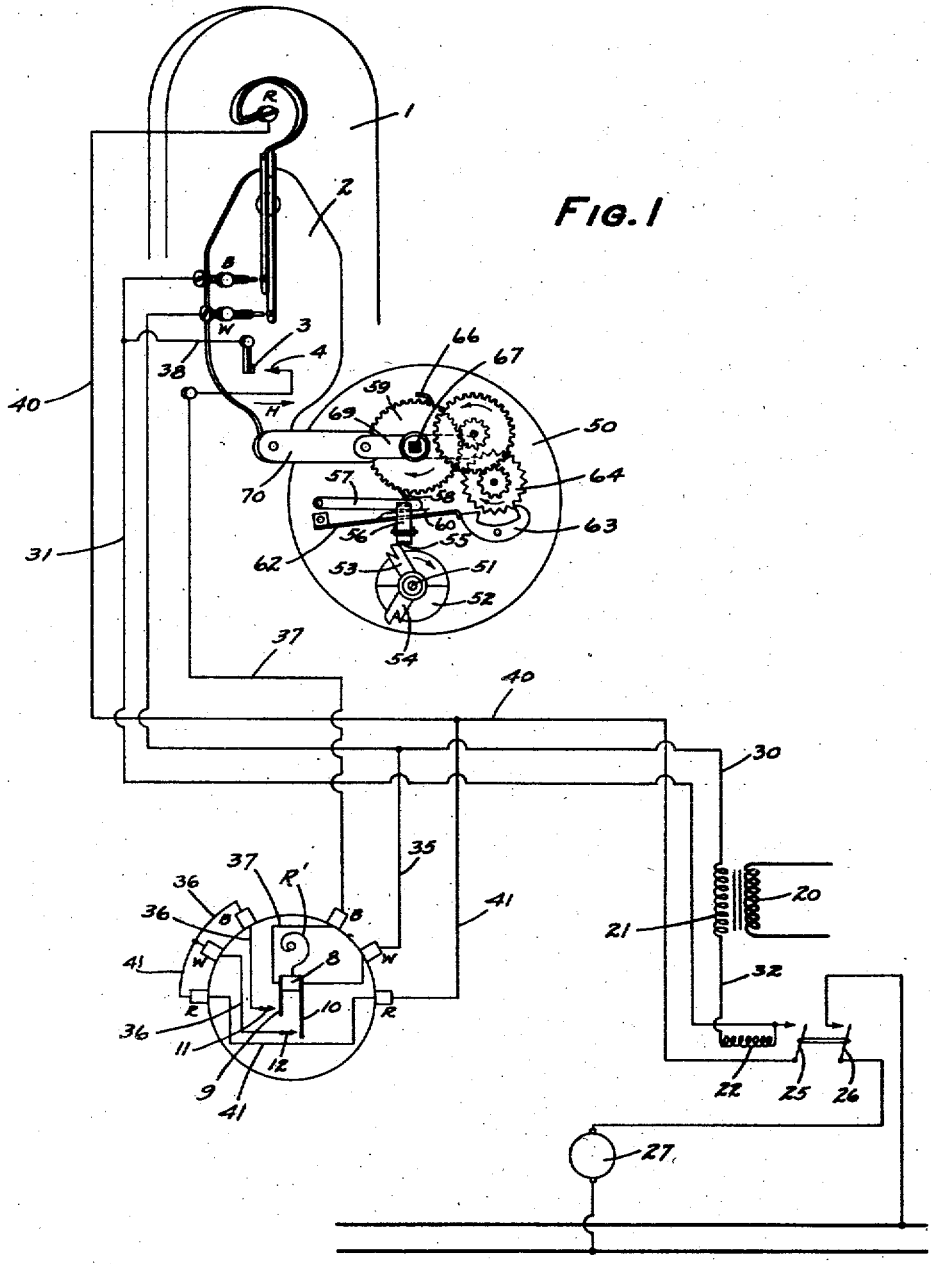
INVENTOR
GEORGE D. KINGSLAND
BY Paul, Paul & Moore
ATTORNEYS Feb. 20, 1934. G. D. KINGSLAND Re. 19,091
HEAT REGULATING DEVICE
Original Filed March 23, 1931 2 Sheets-Sheet 2
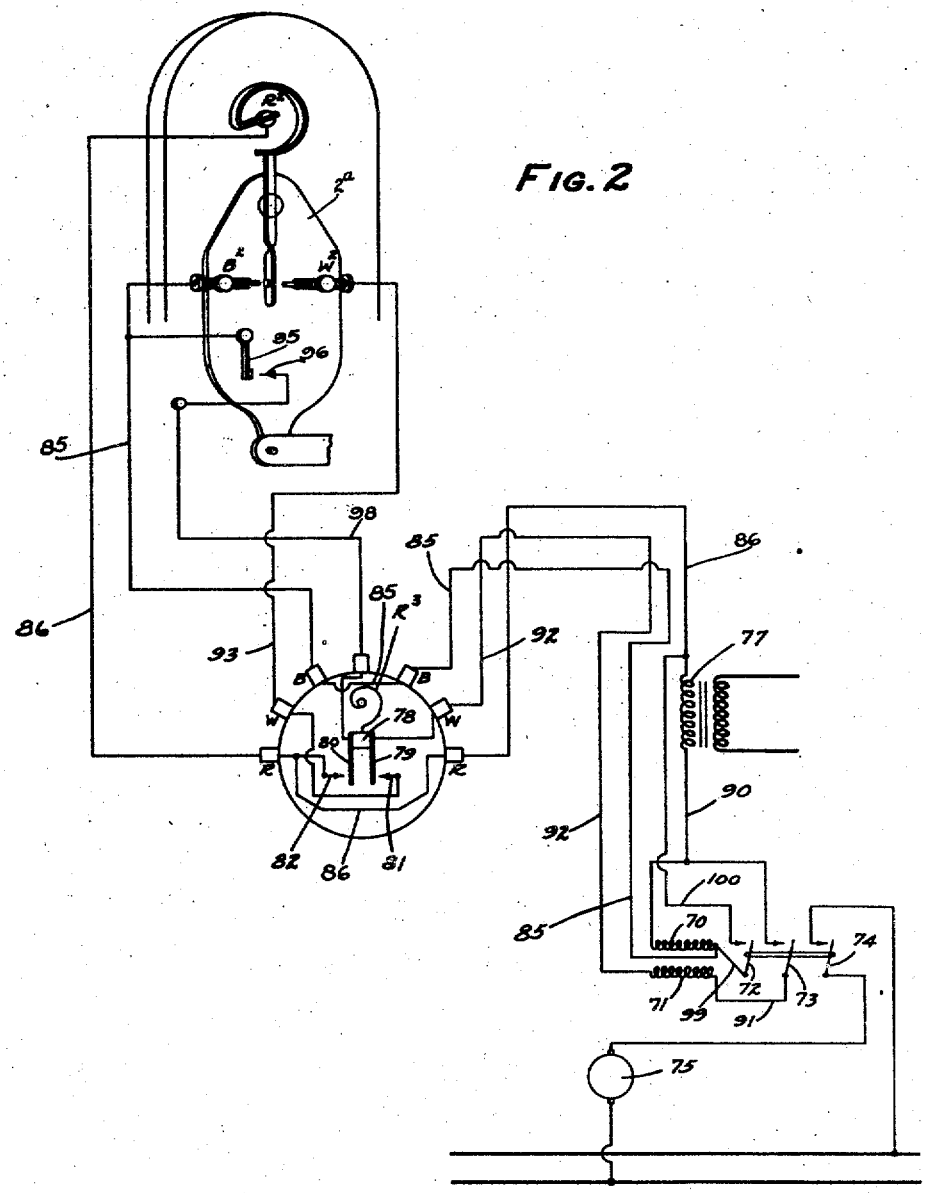
INVENTOR
GEORGE D. KINGSLAND
BY Paul, Paul & Kilgore
ATTORNEYS Reissued Feb. 20, 1934 Re. 19,091

UNITED STATES PATENT OFFICE 19,091

HEAT REGULATING DEVICE

George D. Kingsland, Minneapolis, Minn., assignor to Minneapolis-Honeywell Regulator Company, Minneapolis, Minn., a corporation of Delaware Original No. 1,893,237, dated January 3, 1933, Serial No. 524,598, March 23, 1931. Application for reissue October 30, 1933. Serial No. 695,937

29 Claims. (Cl. 236—9)

This invention relates to improvements in controls for heating systems and has, among its objects, to provide at least two thermostatically operable means for controlling the starting and stopping of the heat supplying apparatus, in a manner to maintain the temperature of the heating apparatus at some predetermined lower temperature limit.

The control of the heating apparatus by means of a room thermostat alone is not satisfactory, because of the large amount of thermal inertia in the average heating system. Before the room temperature drops sufficiently for the room thermostat to call for heat, the heating medium, for example a radiator, has cooled to such a degree that before its temperature can be brought up to that called for by the room thermostat, the house has cooled to an uncomfortable degree, and the normal circulation of air has been reversed so that cold air is felt at the floor line. It is desirable to substantially maintain that heat in the radiator by which cold draft is screened or curtained off by warm air rising from the radiator. In order to prevent too great a cooling of the heating plant or radiator, a control, herein called the low limit control, has been introduced, and this low limit control acts (preferably only during the day) independently of the room thermostat to start the heating supply means whenever the heating medium falls below a certain predetermined minimum temperature, which is ordinarily somewhat lower than that required to heat the room. The average value, for example, for a hot water heating plant satisfactory in all but the mildest weather has been found to be about ninety degrees Fahrenheit, which is sufficient to prevent the water of the system from cooling too much.

However, the introduction of this low limit control results in a more frequent starting and stopping of the burner apparatus than if the room thermostat alone were used, and it is an important object of this invention to provide means whereby the low limit control is rendered inoperative at night, so that occupants will not be disturbed. This invention also provides means for automatically rendering the low limit control inoperative in the evening or at the retiring hour, and automatically rendering the same operative at some predetermined morning or rising hour.

Features of the invention include the use of the room thermostat and low limit control for controlling the heating plant; the provision of parallel starting circuits, one of which passes through the low limit control and another which does not; the provision of a switch in the low limit control starting circuit; the provision of means for automatically closing and opening the switch at stated intervals to render said low limit control respectively operative and inoperative; along with all details of arrangement and construction, as well as combinations and subcombinations of these elements.

Features and advantages of the invention will appear in the description of the drawings forming a part of this application, and in said drawings:

Figure 1 is a diagrammatic view showing application of the invention with that type of thermostat in which a movable thermostatic member is sequentially engageable with its contacts; and Figure 2 is a diagrammatic view illustrating the application of the invention to that type of thermostatic device in which the thermostatic element alternatively or alternately engages with its contacts.

In Figure 1 is diagrammatically shown a system in which the room thermostat is of that type which has a thermostatic switch element sequentially engageable with two contacts both arranged at the same side of the element. This thermostat is indirectly responsive to temperatures of the heating system. The thermostat comprises the thermostatic element R and contacts respectively indicated at B—W. Element R moves to the left when cooling, and first engages contact W, then contact B, to start the heating apparatus. These contacts are mounted on a plate 2 which is pivotally mounted to base 1. On this same plate is mounted a contact 3 which is engageable with companion contact 4′ supported independently of plate 2 to close the starting circuit which includes the contacts of a "low limit control" device, arranged to be more directly responsive to the temperatures of the heating system.

The term "indirectly responsive to temperature of the heating system" refers to a thermostat or thermostatic switch which is the equivalent of a room thermostat responding to the temperature of the space to be heated, while the term "directly responsive to temperature of the heating system" means a thermostat or thermostatic switch which is placed against or in a radiator, or a riser, or the heating plant, or any equivalent placement. The term "low limit control" denotes that thermally responsive device which is more directly responsive to the temperature of the heating system.

This low limit device comprises a thermal element indicated R′, which is adapted to move a block of insulating material 8, and which represents one form of device usable for the purpose herein. This block of insulating material has attached thereto, in spaced relation, two arms respectively indicated 9—10. The arms are adapted to engage respective contacts, these contacts being respectively indicated at 11—12. These contacts are at the same side of the members, and in this respect the type of this device is the same as the other thermostat, that is the arms move in the same direction toward the contacts and the contacts are on the same side of the arms. A suitable power source is indicated at 20, in this case a transformer, the secondary of which is indicated at 21. 22 indicates the coil of a relay which is adapted to control its own holding contact 25, as well as a contact 26 which controls a circuit to a burner motor indicated at 27. This burner motor is part of a heat supplying apparatus or system, and the numeral 27 is meant to refer generally to any kind of an electrically controllable apparatus which can produce heat in a heating system. As used herein the term "heating plant or system" includes steam, hot air, and hot water systems, and any system in which there is a central heating plant which delivers heat directly to a room or to radiators in the room.

A very important feature of this invention is the use of two parallel starting or closing circuits for relay 22, one of which does not pass through the low limit control thermostat and the other of which does pass therethrough. When the switch 3—4 is closed, either one of the thermostatic devices can close the relay to start the burner, but it is necessary that both of the thermostatic devices open their contacts in order to deenergize the relay, and interrupt supply of heat to the system.

Therefore, an important feature is the introduction of the switch (including the contacts 3—4) in the starting circuit which passes through the low limit control or auxiliary thermostatic elements 9—10, and the provision of means for automatically opening and closing this switch, and for timing the periods between opening and closing. By means of switch 3—4 in the starting circuit of the low limit control, frequent starts, characteristic of the double thermostatic control, are prevented at will. When this switch is open, the room thermostat is the only device which can start the burner.

*Operation—first form*

Suppose that the room thermostat is open and contacts 3—4 closed, and suppose that the radiator or the heating plant has cooled to some predetermined minimum temperature and that the contacts of the low limit thermostat R′ have closed. The relay is energized by the parallel starting circuit of the low limit control as follows: From one side of source 21, 30, 35, 10, 12, 36, 11, 9, 37, contacts 3—4, 38, conductor 31, relay coil 22, conductor 32 to other side of source 21. Contacts 25 and 26 are now closed, and by closure of contact 26 the heating plant is started, and the radiators are brought up to some predetermined temperature. The parallel holding circuit through 25 and the low limit control, is as follows: 21, 30, 35, 10, 12, 36, 41, 40, 25, 22, 32, 21. If the room thermostat is satisfied and does not close its contact, the low limit control will, after its call for heat has been satisfied, open its contacts and deenergize relay 21. However, if the contacts of the room thermostat at this time be closed, the relay will remain energized, even though contacts 9—10 thereafter moved away from contacts 11—12. The parallel holding circuit for the room thermostat is as follows: 21, 30, W, R, 40, 25, 22, 32 to 21. Let it be supposed that contacts 9, 10, 11, 12 are open and that the room thermostat calls for heat by closing its contacts W, B, R. The parallel starting circuit is as follows: one side of source 21, 30, W, R, B, 31, 22, 32, 21. The holding circuit has been traced above.

When the switch contacts 3 and 4 are open the only device that can start the burner is the room thermostat, and whatever the position of contacts 3 and 4, the burner can be stopped only when both thermostats open, although either can maintain heat supply while the other is open. It will be understood that when the contacts 3—4 are making, the burner may be started either by the closure of the room thermostat or of the low limit control, but neither can stop production of heat if the other is not satisfied. If R, W of the room thermostat, and 10, 12 of the low limit are closed, both must open to deenergize the relay. This is true whether the switch 3, 4 is closed or open. However, when the switch 3, 4 is open the low limit control is powerless to energize the relay.

Another feature is the means 2 for adjusting the contacts B—W with reference to the thermostatic element R, and the mounting of contact 3 on this adjusting means and the independent mounting of contact 4, so that if the contacts B—W are brought toward the thermostatic element the contacts 3 and 4 are closed, to correspondingly close a starting circuit through the auxiliary thermostat or low limit control for conditioning this auxiliary thermostat to close the relay independently of the room thermostat. This setting corresponds to some morning hour when it is desired to condition the auxiliary thermostat for controlling the heating apparatus. When the plate 2 is moved in direction of the arrow H, the contacts B—W are brought nearer to the element R so that closure at R—W—B will take place at a higher temperature.

In order to open and close the switch 3, 4 and adjust contacts B, W, R, automatically, the following device is employed: The numeral 50 generally indicates a clock-operated device which may be of the type described in my copending application for Control devices filed July 24, 1931, Serial Number 552,900, now Patent No. 1,893,238 issued January 3, 1933. All of the details of this device are not herein shown or described. However, it will be understood that shaft 51 is driven by the clock. To this shaft is adjustably attached a dial 52 (having clock dial graduations, not shown) and arms 53—54 which can be angularly adjusted, one to correspond to some morning hour and the other to some evening hour. These arms are sequentially engageable with arm 55 of a suitably pivoted bellcrank lever, the other arm 56 of which engages a pivoted arm 57 and throws it laterally to the stop 58 of a spring drum 59 of the alarm mechanism of the clock. As shown in the drawings, this arm 57 engages a spring 60, in turn carried by a spring arm 62, the end of which engages an escapement lever 63 as a detent. This lever 63 cooperates with an escapement wheel 64 operated through suitable gearing from the drum 59. It will be understood that when the detent 63 is released, the spring of the alarm mechanism will rotate the parts in the direction of the arrows until the trip 66 (diametrically opposite trip 58) engages the arm 57 and moves it to the position shown in the drawings, stopping the operation of the escapement after 180° rotation of the drum shaft 67, resulting in movement of arm 69, and link 70, and of the support 2 in the direction of the arrow H, and closure of the contacts 3, 4. When the arm 54 engages the lever arm 55, the drum will again be rotated a half revolution to bring the plate to the position shown in the drawing with the contacts 3, 4, open and the contacts B—W spaced a greater distance from the contact R, which corresponds to the evening position, in which the auxiliary or low limit thermostat is rendered inoperative to start the burner apparatus.

*Second form*

In the previously described application of the invention, we were concerned with the type of thermostat in which two contacts were placed at the same side. However, the invention is applicable to that type of thermostat in which the movable element alternatively engages its contacts. This application is shown in Figure 2, and it will be noted that in this case, as well as in the first case, there is a switch in the starting circuit of the auxiliary thermostat, or low limit control. However, in this application, some means must be provided for holding the relay closed when the movable member of the thermostat is engaging one of the contacts, and for deenergizing the relay when the member engages the opposite contact. Therefore, there is used a relay of the plural coil type wherein relay closure is accomplished by energizing one coil, and deenergization and opening of the relay accomplished by energizing another coil.

The main relay coil is indicated at 70 and the choke coil at 71. The relay controls holding contacts 72, for the coil 70, contact 73 in the starting circuit for the coil 71, and contact 74 which controls burner motor 75. It will be understood that numeral 75 indicates any kind of an electrically controllable apparatus which can produce heat. The source is indicated at 77. In this instance, the room thermostat includes the element $R^2$, and the contacts $B^2$ and $W^2$ which are respectively arranged at opposite sides of the element $R^2$, and with which this element can alternatively or alternately engage. The low limit control, placed on the radiator or on a riser leading to the radiator has substantially the same construction as the previously described functionally equivalent device and includes the element $R^3$ (thermally or pressure operated) which carries a block of insulation 78. At one side of the block, is the arm 79 and at the opposite side, the arm 80. The arm 79 cooperates with contact 81 and arm 80 with contact 82. In this instance, parallel starting circuits are provided for respective thermostatic devices, and a switch is provided in that starting circuit which passes through the low limit control and which closes the relay to start the heating apparatus. For the sake of brevity, the circuit connections are not at this time referred to by numeral.

As in the first case, a switch is connected in the starting circuit of the low limit control. After the heat supply has once been started, if the room thermostat should call for a shut down before the low limit control is satisfied, the supply of heat will continue until said low limit is satisfied.

*Operation—second form*

Assuming a call for heat by the room thermostat and a closure at $R^2$—$B^2$, and assuming the low limit control to be in open-contact position as shown. In this instance, the circuit will be closed to the relay by the thermostat as follows: one side of the source 77, 90, closing coil 70, conductor 85, $B^2$, $R^2$, conductor 86, to opposite side of source 77. With the energization of the relay, contacts 72, 73 and 74 are closed. The relay is held closed by the following circuit: 77, 90, 70, 99, 72, 100 to 77. After the heat call has been satisfied, the element $R^2$ swings in the opposite direction and engages $W^2$ in which case coil 71 is energized to effect a release or opening of the relay or weakening of the magnetic flux in coil 70. The circuit is as follows: one side of source, conductor 90, contact 73, conductor 91, coil 71, conductor 92, arm 79, contact 81 (because the delivery line of radiator is at this time sufficiently hot) conductor 93, $W^2$, $R^2$, conductor 86, to opposite side of source 77.

Let it now be assumed that the room thermostat is positioned as shown in the drawings midway between its contacts, and that the switch 95—96 is closed, and that the temperature of the heating line or radiator has fallen below a predetermined minimum. This will result in the engagement of arm 80 with contact 82, which contacts are in the starting circuit for the relay, which circuit also passes through contacts 95—96. The coil 70 will, therefore, be energized through the following circuit: one side of source 77, 90, 70, 85, 97, 95, 96, 98, 80, 82, 86 to opposite side of source 77. Contacts 72, 73, 74 will close and the motor apparatus will be energized. The holding circuit for coil 70 has been previously described. When this call for heat by the low limit control has been satisfied, the element $R^3$ will swing in the opposite direction and arm 79 will engage contact 81, closing the circuit to the coil 71 in the following manner: one side of source 77, 90, contact 73, 91, coil 71, conductor 92, 79, contact 81, 93, $W^2$, $R^2$, 86, to opposite side of source 77. $W^2$, $R^2$ are making because the room is, under these conditions, sufficiently warm to close them. As in the first case, when the contacts 95—96 are open, energization of coil 70 through the low limit control contacts cannot occur.

The support $2^a$ for adjusting the contacts $B^2$—$W^2$ with reference to $R^2$ is operated by timing means in exactly the same way as previously described.

It will be understood that neither switch 3—4 of Figure 1, nor switch 95—96 of Figure 2 have to be controlled by clock mechanism. Either may be manually controlled.

I claim as my invention:

1. In a heating system, means for producing heat including a relay adapted when closed to initiate heat production, a thermostat responsive to temperatures in the space to be heated, a thermostat more directly responsive to the temperature of the heat producing means, circuits adapting either thermostat to close the relay, including a circuit which has therein a switch and said last mentioned thermostat, and clock-controlled means for automatically closing and opening said switch.

2. A first thermostatic switch, a second thermostatic switch, a relay having a holding contact, a starting circuit including therein said first switch and said relay, a holding circuit including said first switch said holding contact and relay, and a parallel starting circuit for said relay including therein said second switch a third switch and said relay.

3. A first thermostatic switch comprising a movable member and two contacts engageable thereby, a second thermally operable switch comprising two members insulated from one another and two contacts engageable thereby, a relay having a holding contact, a starting circuit including therein said first switch and said relay, a holding circuit including said first switch said holding contact and relay, and a parallel starting circuit for said relay including therein said second switch a third switch and said relay.

4. A first thermostatic switch comprising a movable member and two contacts sequentially engageable thereby, a relay and a holding contact controlled thereby, a second thermally operable switch comprising two members insulated from one another, and two contacts engageable thereby, a starting circuit including therein said movable member and both contacts of said first switch, and said relay, a holding circuit including said movable member and one of said contacts of said first switch and said holding contact and relay, a parallel starting circuit for said relay including therein both members of said second switch and both of its contacts, a third switch and said relay.

5. A first thermostatic switch comprising a movable member and two contacts engageable thereby, a relay and a holding switch controlled thereby, a second thermally operable switch comprising two members insulated from one another, and two contacts engageable thereby, a starting circuit including therein said first switch and said relay, a holding circuit including said movable member and one of said contacts and said holding switch and relay, and a parallel starting circuit for said relay including therein both of the members of the second thermally operable device and both of its contacts, a third switch and said relay.

6. A first thermostatic switch comprising a movable member and two contacts engageable thereby, a relay and a holding switch controlled thereby, a second thermally operable switch comprising two contacts and two members insulated from one another, and engageable with respective contacts, a starting circuit including therein said movable member and both contacts of said first switch, and said relay, a holding circuit including said movable member and one of said contacts of said first thermally operable switch and said holding switch and relay, and a parallel starting circuit for said relay including therein both of the members of the second thermally operable device and their corresponding contacts and a third switch, and a parallel holding circuit for the relay including therein one of said members and corresponding contact of the second thermally responsive switch, and said holding switch.

7. A first thermostatic switch comprising a movable member and two contacts engageable thereby, a relay and a holding switch controlled thereby, a second thermally operable switch comprising two contacts and two members insulated from one another, each engageable with a respective contact, a starting circuit including in series said movable member and said relay, a holding circuit including said movable member and one of said contacts of said first thermally operable switch and said holding switch and relay, and a parallel starting circuit for said relay including therein both of the members of the second thermally operable device and their corresponding contacts and a third switch, and a parallel holding circuit for the relay including therein one of said members and corresponding contact of the second thermally responsive switch, said holding switch and said relay.

8. A heating system including a central heating plant and electrically operable means for controlling production of heat at the plant, a first thermostatic switch responsive to temperature conditions at a part of the system other than the central plant and having adjustable contacts and means for adjusting them toward and away from one another, a second thermostatic switch responsive to temperatures at the central plant, circuits controllable by said thermostatic switches to in turn control said electrically operable heat producing means, the circuits being so arranged that both thermostats can initiate a heat producing operation but so that the second switch can maintain heat production independently of the first thermostat, if temperature of the plant is below a predetermined minimum and switching means adjustable with the contacts of the first thermostatic switch for preventing starting of said heat-production-controlling means by said second thermostatic switch.

9. A heating system including a central heating plant and electrically operable means for controlling production of heat at the plant, a first thermostatic switch indirectly responsive to temperature of the heating system and having adjustable contacts and means for adjusting them toward and away from one another, a second thermostatic switch directly responsive to temperature of the heating system, and circuits controllable by said thermostatic switches to in turn control said electrically operable heat producing means, and circuits so arranged that both thermostats can initiate a heat producing operation but so that the second mentioned switch can maintain heat production independently of the first thermostat, said circuit including a switch associated with the adjusting means of said first thermostat and adapted when open to render said second thermostat incapable of initiating heat production, and means operable by the adjusting means to open the switch as the contacts of the first thermostat are adjusted in direction away from one another.

10. In a heating system, electrically operable means for controlling production of heat, a first thermostatic switch indirectly responsive to temperature of the heating system and comprising a movable member and two contacts engageable thereby, a relay, and holding contact therefor, a second thermostatic switch directly responsive to temperature of the heating system comprising two contacts insulated from one another and engageable with respective contacts, a starting circuit for the electrically operable means including therein said movable member and the contacts of said first thermally operable switch and said relay, a holding circuit including the movable member and one of said contacts of the first thermostatic switch and said holding switch and relay, a parallel starting circuit for said relay including therein both of the members of the second thermally operable device and corresponding contacts, and a third switch, and a parallel holding circuit for the relay including therein one member and corresponding contact of the second thermally responsive switch and said holding switch.

11. A heating system and electrically operable means for controlling production of heat, a first thermostatic switch indirectly responsive to temperature of the heating system, a second thermostatic switch directly responsive to such temperature and circuits controllable by said thermostatic switches to in turn control said electrically operable heat producing means, the circuits being so arranged that both thermostatic devices can initiate a heat producing operation but so that the first can maintain heat production independently of the second, and including a starting circuit which passes through the second switch and which is independent of the starting circuit of the first switch, and which has therein a switch, and timing means for automatically opening and closing the switch at predetermined intervals.

12. A heating system comprising, a central heating plant, means for controlling production of heat at the plant, a first thermostat indirectly responsive to temperature of the heating plant for starting the operation of said means, a second thermostat directly responsive to temperature of the heating plant for starting the operation of said means when the temperature at the second thermostat is below a predetermined minimum and independently of the first thermostat, and mechanism for preventing starting of said means by the second thermostat.

13. A heating system comprising, a central heating plant, means for controlling production of heat at the plant, a first thermostat indirectly responsive to temperature of the heating plant for starting operation of said means, a device for calibrating said first thermostat, a second thermostat directly responsible to temperature of the heating plant for starting operation of said means when the temperature is below a predetermined minimum, and independently of the first thermostat, and mechanism operated by said calibrating device for preventing starting of said means by the second thermostat.

14. A heating system comprising, a central heating plant, means for controlling production of heat at the plant, thermostatic mechanism in the space to be heated for operating said means to maintain a predetermined temperature in the space, an automatically operable device for adjusting the thermostatic mechanism so that at night the space will be maintained at some predetermined minimum temperature, a thermostat directly responsive to temperature of the heating plant for operating said means to maintain a predetermined minimum temperature at the plant irrespective of room temperature, and mechanism operated by said automatically operable device when adjusted for the purpose mentioned to prevent starting of said means by the last mentioned thermostat.

15. A heating system comprising, a central heating plant, electrical means for controlling the production of heat at the plant, a contact-controlling room thermostat for operating said means to maintain a predetermined temperature in the space to be heated, a clock directly associated with the room thermostat for changing its setting at predetermined intervals, a thermostat directly responsive to temperature of the heating plant to maintain said temperature above a predetermined minimum, and mechanism operated by the clock simultaneously with the setting change of the room thermostat for preventing starting of said means by the last mentioned thermostat.

16. A heating system including means for controlling the production of heat, a room thermostat, a limit thermostat directly responsive to heating plant temperatures, means for adjusting the calibration of the room thermostat, an auxiliary switch, and means including circuits by which heat production can be initiated by either thermostat and by which heat production is maintained until both said thermostats open, whatever the control position of the auxiliary switch and by which if the auxiliary switch is open, heat production cannot be initiated by a circuit passing through said limit thermostat.

17. A heating system comprising a central heating plant, means for controlling heat production by the plant, a thermostat for controlling said heat controlling means, a thermostat directly responsive to the temperature of the heating system for maintaining the temperature of the heat producing means above a predetermined minimum, and clock controlled mechanism for alternately changing the setting of the room thermostat and preventing or permitting starting of said heat control means through the last mentioned thermostat.

18. A heating system of the class described, comprising, in combination, means for heating a space, thermostatic means responsive to the space temperature associated with said heating means for initiating operation of the same to produce more heat when the space temperature falls to a predetermined minimum, a thermostat more directly responsive to the temperature of the heating means associated with the heating means for initiating operation of the heating means to supply additional heat to said space when the temperature to which said thermostat responds falls to a predetermined minimum irrespective of the space temperature, and automatic means associated with said thermostatic means and thermostat for periodically lowering the temperature at which said thermostatic means initiates operation of said heating means to supply more heat and for simultaneously rendering said thermostat inoperative to initiate operation of said heating means to supply more heat.

19. A heating system of the class described, comprising, in combination, means for heating a space, thermostatic means responsive to the space temperature associated with said heating means for initiating operation of the same to supply more heat when the space temperature falls to a predetermined minimum, a thermostat more directly responsive to the temperature of the heating means associated with the heating means for initiating operation of the heating means to supply additional heat to said space when the temperature to which said thermostat responds falls to a predetermined minimum irrespective of the space temperature, and time controlled means associated with said thermostatic means and thermostat for lowering the temperature at which said thermostatic means initiates operation of said heating means to supply more heat and for simultaneously rendering said thermostat inoperative to initiate operation of said heating means to supply more heat for a predetermined length of time.

20. A heating system of the class described, comprising, in combination, means for heating a space, a space temperature responsive thermostat associated with said heating means for initiating operation of the same when the space temperature falls to a predetermined minimum, a second thermostat more directly responsive to the temperature of the heating means associated with the heating means for initiating operation of the heating means to supply additional heat to said space irrespective of the space temperature when the temperature to which said second thermostat responds falls to a predetermined minimum, and time controlled means associated with said thermostats for lowering the temperature at which said first-named thermostat initiates operation of said heating means to supply more heat and for rendering said second thermostat inoperative to initiate operation of said heating means to supply more heat for a predetermined time period.

21. A heating system of the class described, comprising, in combination, heat producing means for heating a space, thermostatic means responsive to space temperature for operating said heat producing means to maintain the space temperature above a predetermined minimum, a thermostat more directly responsive to the temperature of the heat producing means for operating the same to maintain the temperature of the heat producing means above a predetermined minimum irrespective of the space temperature, and means for lowering the temperature above which the thermostatic means maintains said space and for preventing initiating operation of the heat producing means by said thermostat to produce more heat.

22. A heating system of the class described, comprising, in combination, heat producing means for heating a space, a space temperature responsive thermostat for operating said heat producing means to maintain the temperature of the space above a predetermined minimum, a second thermostat more directly responsive to the temperature of the heat producing means for operating the same to maintain the temperature thereof above a predetermined minimum irrespective of the temperature of the space, and time controlled means for preventing initiating operation of the heat producing means by said second thermostat to produce more heat.

23. A heating system of the class described, comprising, in combination, heat producing means for heating a space, a space temperature responsive thermostat for operating said heat producing means, a second thermostat more directly responsive to the temperature of the heat producing means for operating the same to maintain the temperature thereof above a predetermined minimum irrespective of the space temperature, and time operated means for changing the setting of the space thermostat and for preventing initiating operation of the heat producing means by said second thermostat to produce more heat.

24. A heating system of the class described, comprising, in combination, heat producing means for heating a space, thermostatic means responsive to space temperature for operating said heat producing means normally to maintain the space temperature above a predetermined minimum, a thermostat more directly responsive to the temperature of the heat producing means for operating the same normally to maintain the temperature thereof above a predetermined minimum irrespective of the space temperature, means for lowering the minimum temperature above which said thermostatic means maintains said space, for preventing initiating operation of the heat producing means by said thermostat to produce more heat, and for returning said system to normal operation, and time controlled means for recurrently operating said means at predetermined times in the evening and morning.

25. In combination, means for supplying heat to a space, thermostatic means responsive to space temperature for controlling said heat supplying means to maintain the temperature of the space above a predetermined minimum, a thermostat more directly responsive to a temperature condition of the heat supplying means for operating the heat supplying means to maintain said temperature condition above a predetermined minimum irrespective of the space temperature, and automatic means for rendering said thermostat incapable of initiating operation of said heat supplying means while permitting said thermostatic means to initiate operation of the heat supplying means.

26. In a heating system of the class described, in combination, electrically controlled heating means, thermostatic means responsive to the temperature of a space to be heated, a thermostat more directly responsive to the temperature of the heating means, electrical connections between said thermostatic means and thermostat and the heating means whereby operation of the latter can be initiated by either of the former, an auxiliary switch in circuit with said thermostat, means for changing the temperature at which said thermostatic means initiates operation of the heating means, and connections between said means and auxiliary switch.

27. In combination, heating means, a first thermostat in control thereof, a second thermostat more directly responsive to the temperature of the heating means, connections adapting the second thermostat to initiate operation of the heating means irrespective of the temperature at the first thermostat, adjusting means associated with the first thermostat for changing the setting thereof, and connections controlled by said adjusting means and associated with said second thermostat for preventing the second thermostat from initiating operation of the heating means.

28. In combination, electrically controlled heating means, a first thermostat, a second thermostat, electrical connections between said thermostats and heating means for enabling either of the thermostats to initiate operation of the heating means independently of the other, an auxiliary switch in circuit with one of said thermostats, adjusting means for the other of said thermostats, and connections between said adjusting means and auxiliary switch.

29. In combination, electrically controlled heating means, a first thermostat, a second thermostat, electrical connections between said thermostats and heating means for enabling either of the thermostats to initiate operation of the heating means independently of the other, an auxiliary switch in circuit with one of said thermostats, time controlled adjusting means associated with the other of said thermostats for recurrently changing the setting thereof at predetermined times, and connections between said adjusting means and auxiliary switch for opening and closing the latter incident to the lowering and raising of the setting of said one of the thermostats.

GEORGE D. KINGSLAND.